United States Patent [19]

O'Leary et al.

[11] Patent Number: 5,937,393
[45] Date of Patent: Aug. 10, 1999

[54] ORDER PROCESSING METHOD IN A DISTRIBUTED PROCESSING SYSTEM WITH LOCAL VALIDATION AND DYNAMIC CONTROL OF THE ORDER REQUEST THROUGH A CONFIGURATION MATRIX

[75] Inventors: Aidan O'Leary; Eoin Maguire, both of Dublin, Ireland

[73] Assignee: Portspring Limited, Dublin, Ireland

[21] Appl. No.: 08/779,951

[22] Filed: Dec. 23, 1996

[30] Foreign Application Priority Data

Dec. 21, 1995 [IE] Ireland ..................................... 950977
Jan. 18, 1996 [IE] Ireland ................................... S960040

[51] Int. Cl.[6] ............................ G06F 5/163; G06F 17/60; G06F 153/00
[52] U.S. Cl. ................................. 705/21; 705/16; 705/26; 235/380
[58] Field of Search .................................. 705/21, 16, 26, 705/27; 235/380, 383; 395/200.68

[56] References Cited

U.S. PATENT DOCUMENTS

| | | | |
|---|---|---|---|
| 4,016,405 | 4/1977 | McCune et al. | 235/380 |
| 4,386,266 | 5/1983 | Chesarek | 235/380 X |
| 4,594,663 | 6/1986 | Nagata et al. | 235/380 X |
| 4,755,940 | 7/1988 | Brachtl et al. | 235/382 X |
| 4,859,838 | 8/1989 | Okiharu | 705/22 |
| 4,891,503 | 1/1990 | Jewell | 705/44 |
| 4,947,028 | 8/1990 | Gorog | 235/380 |
| 5,231,570 | 7/1993 | Lee | 235/380 X |
| 5,255,182 | 10/1993 | Adams | 705/21 X |
| 5,289,371 | 2/1994 | Abel et al. | 705/26 |
| 5,315,508 | 5/1994 | Bain et al. | 705/28 |
| 5,329,589 | 7/1994 | Fraser et al. | 705/44 X |
| 5,334,824 | 8/1994 | Martinez | 235/380 X |
| 5,490,251 | 2/1996 | Clark et al. | 395/200.67 |
| 5,570,291 | 10/1996 | Dudle, Jr. et al. | 705/10 X |
| 5,598,462 | 1/1997 | Truemmer et al. | 379/216 X |
| 5,666,493 | 9/1997 | Wojcik et al. | 705/26 |
| 5,678,010 | 10/1997 | Pittenger et al. | 395/200.68 X |
| 5,694,551 | 12/1997 | Doyle et al. | 705/26 |
| 5,758,327 | 5/1998 | Gardner et al. | 705/26 |
| 5,793,028 | 8/1998 | Wagener et al. | 235/380 |
| 5,808,894 | 9/1998 | Wiens et al. | 705/26 |
| 5,852,809 | 12/1998 | Abel et al. | 705/26 |

FOREIGN PATENT DOCUMENTS

| | | |
|---|---|---|
| 0425405 | 5/1991 | European Pat. Off. . |
| 0585932 | 3/1994 | European Pat. Off. . |
| WO94/28497 | 12/1994 | WIPO . |

*Primary Examiner*—Allen R. MacDonald
*Assistant Examiner*—Michele Stuckey Crecca
*Attorney, Agent, or Firm*—Jacobson, Price, Holman & Stern, PLLC

[57] ABSTRACT

An order processing method for implementation in a distributed computer system is described. An order create request is received from a user at a local station, validated locally and routed to a remote station for authorization. Connection between local and remote stations may be of any type. Progress of an order is tracked by a configuration matrix, and communication is tracked and controlled by a router slip appended to an order message and which is in turn governed by the matrix. The matrix allows selection of a current control register which governs applicability of validation routines to data entities of the request or order. Paper handling is reduced or eliminated and sufficient control for decentralised purchasing is achieved.

12 Claims, 5 Drawing Sheets

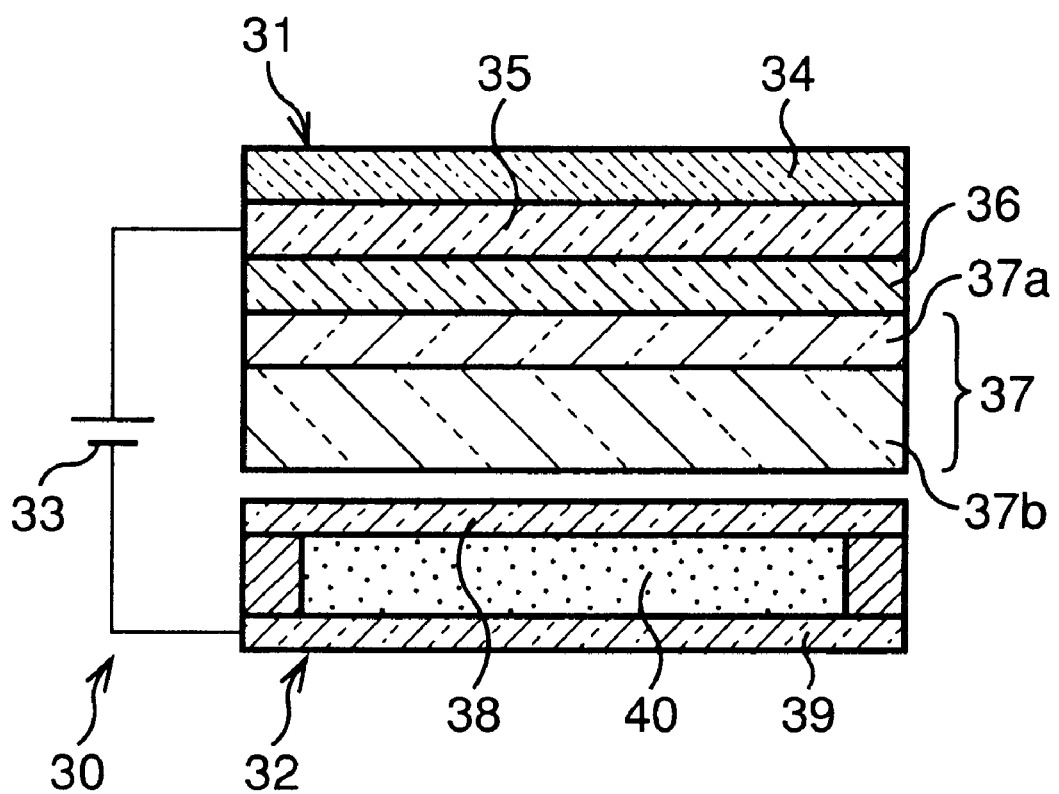

Fig. 2(b)

| Order ... Help | | | | | | |
|---|---|---|---|---|---|---|
| Commodity | Supplier Code | | | Deliver to | | |
| | S-0933E | | | | | |
| Supplier Name | | | | Third Party ? | ○ Yes | ⦿ No |
| | | | | Ship to ? | ○ Yes | ⦿ No |
| Short Supplier Name | Agreement | | | Additional Information | | |
| | | Browse | | Internal Notes | ○ Yes | ⦿ No |
| Address | | | | External Notes | ○ Yes | ⦿ No |
| | | | | Functional Endorser | ○ Yes | ⦿ No |
| | | | | Order Type | | |
| | | | | Service Order ? | ○ Yes | ⦿ No |
| Tel/Fax | Tel. 751.351 | | | | | |
| Chart of Accounts | 748 | 16218 | 302 … 0000 | Capital Order ? | ○ Yes | ⦿ No |
| | | | TOE | Capital Number ? | | |
| Contract Ledger | | | … | 950000 000 0000 000000000 | | |
| Description | Cables | | | Project Code | | |
| Attn. of | | | | Date Reqd. | Cancel | OK |
| Our Ref. | | | | 12/05/97 | Issue | Template |
| | | | | Total Value | 4.14 | GBP … |

| Item | Description | Quantity | Unit | Unit Price | Disc(%) | Total | Certs |
|---|---|---|---|---|---|---|---|
| 0001 | Cables | 12.00 | mm | .345 | 0.00 | 4.14 | |

Add Item | Modify Item | Delete Item | View Item

| Validation Routines | Output | Control Register | Action |
|---|---|---|---|
| A | False | Not Applicable | – |
| B | True | STOP | – |
| C | False | STOP | – |
| D | False | WARNING | Halt Method |
| E | True | STOP & DISPLAY | Log Error Message |
| F | False | WARNING | – |
| G | True | WARNING | Log Error Message |
| H | True | Not Applicable | – |

ORDER PROCESSING METHOD IN A DISTRIBUTED PROCESSING SYSTEM WITH LOCAL VALIDATION AND DYNAMIC CONTROL OF THE ORDER REQUEST THROUGH A CONFIGURATION MATRIX

BACKGROUND OF THE INVENTION

1. Field of the Invention

The present invention relates to an order processing method in a distributed computer system.

2. Prior Art Discussion

A number of order processing methods are known for handling customer orders. Examples of various order processing methods are described in European Patent Nos. EP 0 425 405 A2 and EP 0 585 932 A2 and United Kingdom Patent No. GB 2 265 032. While these methods address the problems associated with inventory tracking and stock control management, validation of the order is limited to ensuring correct receipt of the order. EP 0 585 932 describes a system for performing order validation and generating shipping labels requiring minimal operator input. Additionally, it is known to provide a system to facilitate electronic processing of customer orders, as described in WO 94/28497.

While such systems accurately track orders and ensure that submitted orders are correctly formatted, they do not adequately address the need to verify an operators authority to place such an order. Further, the prior art systems do not adequately address the problems of managing orders in a distributed system used by personnel at mutually remote locations. As a result, in larger organisations excessive resources are committed to validating and authorising purchase orders prior to submission to suppliers. This involves a large degree of paper handling. This can cause processing delays and failure to deliver ordered items in good time.

SUMMARY OF THE INVENTION

It is an object of the invention to provide an order processing method which significantly reduces the level of paper handling for distributed environments. Another object is to provide more comprehensive validation control for decentralised purchasing.

According to the invention there is provided an order processing method carried out in a distributed data processing system and comprising the steps of:

a local station of the system receiving an order create request, identifying a relevant order type, retrieving a prompt file associated with said order type, and prompting user input of order request data according to the prompt file;

generating a configuration matrix storing order request parameter values including the order type, required action data, and validation data;

validating the request according to validation routines with at least some of the request data entities;

writing data of valid requests to a message file and appending a router slip comprising a source identifier and a set of tasks derived from the configuration matrix, the tasks indicating users from which authorization is required; and transmitting the message file and the router slip to nodes of the distributed system until the slip records satisfactory performance of all of said tasks.

The inputting validation using the prompt file, followed by use of the configuration matrix for initial validation in the above manner ensure data integrity from an early stage before much user time is required. The matrix ensures that the request is dynamically tracked so that it may be efficiently handled. Inter-relationship of the matrix and the router slip ensure that validation, order processing and communication are correctly and efficiently implemented. The important aspect of the matrix is the data stored to allow tracking, not the layout—it may be in grid or simple linear formats.

In one embodiment, a node of the system which receives the message file and router slip:

retrieves from the router slip a required authorization code to allow user authorization at the node;

regenerates the order request from the message file;

writes user authorization data to the router slip using the codes; and re-validates the order request according to validation routines associated with at least some of the data entities.

This ensures control of the order authorization across remote sites. Preferably, the node performs the further step of appending a node address to the router slip, writing the order request data to a message file and transmitting the message file and the router slip to a remote node.

In one embodiment, the router slip is generated by instantiation of task objects from a template according to the configuration matrix. This allows comprehensive control of the slips. Preferably, the task objects are instantiated by applying rules using matrix data to determine if a task object of the template applies to the particular order request. This provides for very simple and uniform slip creation.

Ideally, the rules are stored with the instantiated task objects, and the method comprises the further steps of dynamically determining applicability of the task objects at subsequent order stages by applying the rules with current matrix data. This feature allows constant, dynamic, and uniform control of the slip in real time.

In one embodiment, the router slip stores tasks which cause transmission of notification signals to nodes of the system. This is very advantageous for distributed purchasing as it allows very simple and comprehensive dissemination of information.

In another embodiment the request is validated by:

generating a control register for the order request by selectively comparing data entities of the inputted order request with a reference register, the control register indicating relative importance of the entities by storing an entry indicating for each data entity that validation is not applicable, could result in a warning, or could stop the request;

validating the order request by retrieving a set of validation routines and running each routine with respect to an order request data entity, and identifying as invalid an entity if both the routine output is false and the associated control register entry indicates a warning or a request stop;

outputting an error message if the control register indicates a warning for an invalid entity; and halting the request if the control register indicates a stop for an invalid entity.

The control register thus allows relatively standard validation routines which are associated with data entities to be used throughout the distributed system. It effectively masks them for customisation at the appropriate request stage.

In one embodiment the method comprises the further step of accessing a lookup table of relevant data to input to the order request when creating the order request. This allows a large degree of centralised control in a distributed environment.

In one embodiment, the lookup table is generated by:

an administration processor of the system parsing selected text portions of an inputted administration message by iteratively identifying space characters in the selected text portions to isolate each word;

comparing each isolated word against a predefined list of noise words;

ignoring isolated words found in the list;

generating a keyword file with isolated words and associated words;

generating a lookup file from the keyword file by indexing and writing non duplicate entries of the keyword file.

This is a very effective tool for technically capturing a user's knowledge for dissemination throughout the system.

Ideally, the step of directing the message file and attached router slip to a remote station includes the steps of:

identifying a transport protocol for a connection between the local and remote stations; and encoding the message file and attached router slip in response to the identified transport protocol with a predefined encoding table.

In one embodiment, the step of decoding the message file and attached router slip includes the steps of:

identifying a transport protocol for a connection between the local and remote stations; and aligning bytes associated with the message file and associated router slip in response to the identified transport protocol.

DETAILED DESCRIPTION OF THE INVENTION

BRIEF DESCRIPTION OF THE DRAWINGS

The invention will be more clearly understood from the following description thereof, given by way of example only with reference to the accompanying drawing in which:

FIG. 3 is a table showing relationships between validation routines, a control register and validation actions.

DESCRIPTION OF THE PREFERRED EMBODIMENTS

Figure 1A:
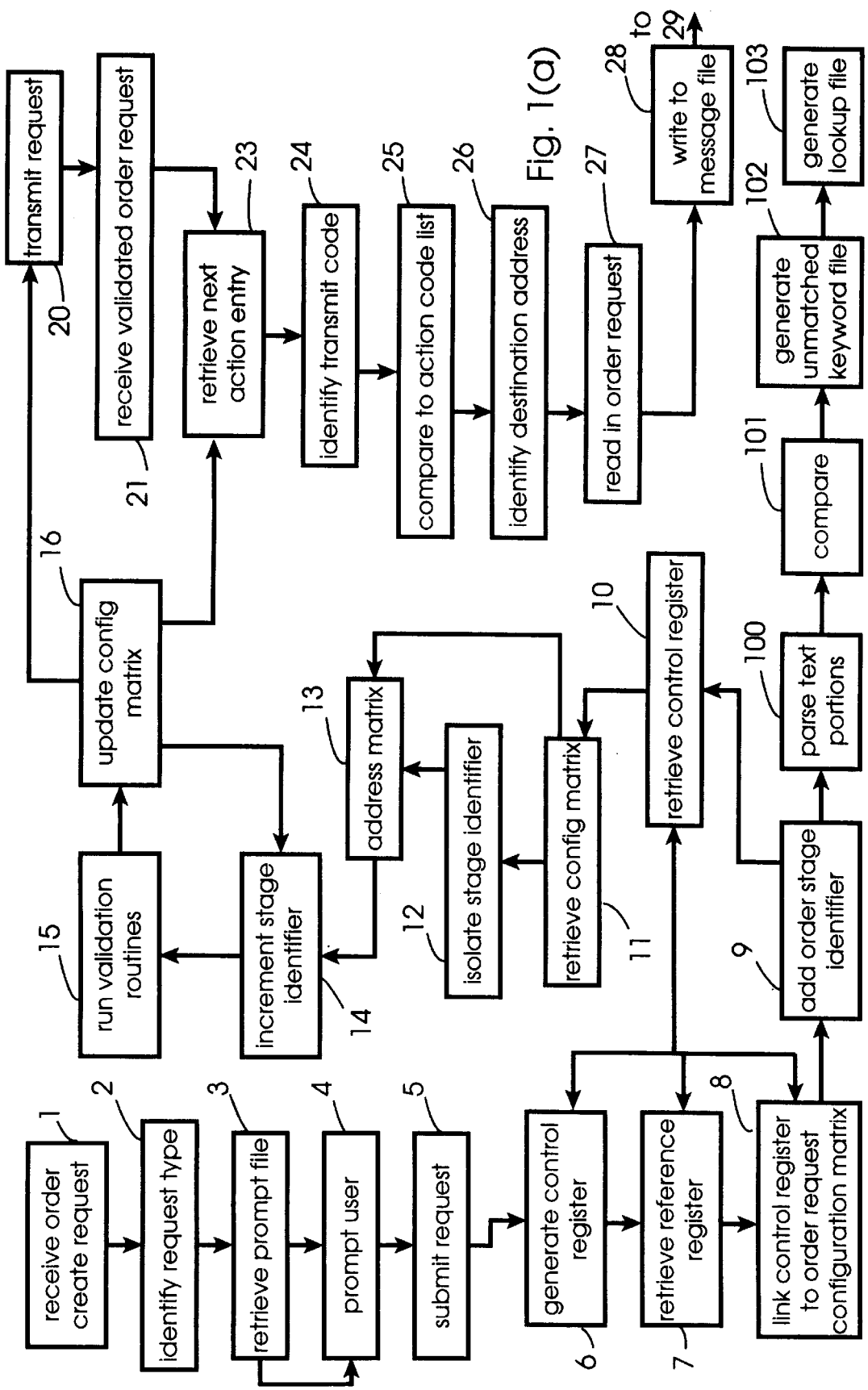
FIG. 1(*a*) and 1(*b*) are together a flow diagram of an order processing method of the invention, FIG. 2(*a*) and 2(*b*) are illustrations of data input screens displayed by a system carrying out the method.
Figure 1B:
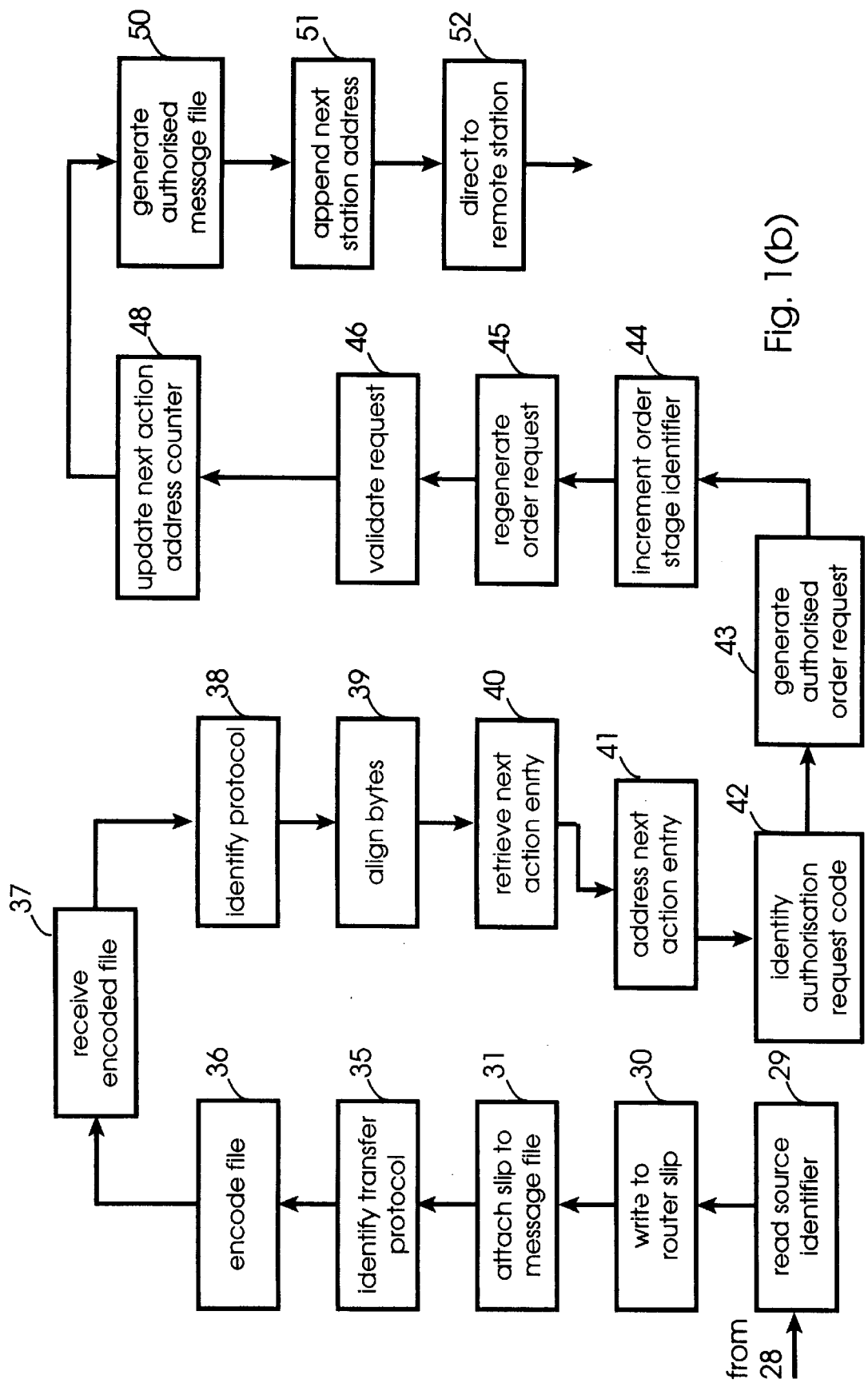

Referring to FIGS. 1(*a*) and 1(*b*) there is illustrated an order processing method according to the invention carried out in a distributed computer system. The system may be of any suitable distributed type having interconnected nodes or stations. Conventional microprocessors and LAN links have sufficient processing and communications capabilities. Typical systems include Intranet and Internet systems using such languages as Java™ and Java™ virtual machines running on such platforms as Windows '95™, Solarus™, HPUX™ with browser-based front ends. The method may also be run on a LAN or WAN with any desired number of machines, subject to capacity. In this specification "nodes" or "stations" may be physical or logical. For example, a node may be the current location of a user, instead of a physical machine.

Figure 2A:
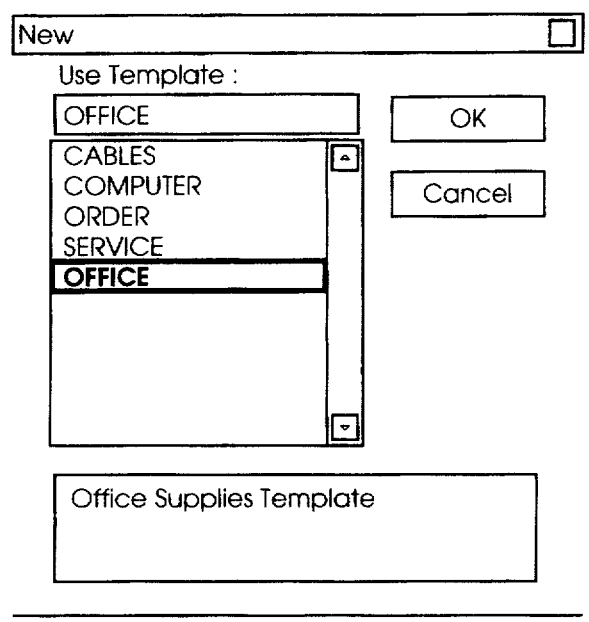

An order create request is received from a user at a local station in step 1. The order request type associated with the order create request of step 1 is identified in step 2 by comparing the order request type with a number of predefined, permitted order request types. This order request type might typically be an order request for office stationery requiring little authorization, or a major capital expenditure request necessitating many layers of authorization. A sample of a displayed list of order types is shown in FIG. 2(*a*).

A prompt file associated with the order request type identified in step 2 is retrieved in step 3 and used to prompt the user in step 4. These prompts are therefore specific to the identified order request type, permitting the user to input only necessary order request data without having to filter out unnecessary detail. A screen for a prompt file is shown in FIG. 2(*b*).

When all of the request data has been entered, the order request is submitted in step 5 by activating a validation controller. The local station then generates a control register in step 6 for the order request. The control register is generated by selecting each data entity of the inputted order request in turn and comparing it with the appropriate section of a reference register retrieved in step 7. Portions of the request which are validated may include validation of suppliers, credit card or spend limits among others. The validation is achieved by generating a configuration matrix for the order request. The matrix has a set of parameter values for the order request including an order stage identifier, the order type, and action lists, including user lists. Thus, the matrix dynamically tracks progress of an order request at all times and allows selection of appropriate routines and data in real time according to business policy and rules. This is very important as it allows real time control in a distributed environment.

The current matrix is used to automatically select the reference register which is appropriate, the matrix itself being retrieved using relational database links with the order request identifier.

The control register is a set of control flags, one per data entity. The possible flag values are:

Not applicable

Warning

Stop

Stop and display error message

Additional control flags could also be used.

Because multiple levels of validation are used, the method allows a large degree of flexibility to help ensure the order is processed to the maximum extent through the distributed system without sacrificing data integrity. The control register is linked by a relational database link to the configuration matrix in step 8 and an order stage identifier is added in step 9. This data structure is indexed by a dynamic pointer array pointing to parent/child tags, each having an offset value and a length. The data itself comprises ASCII characters, encoded with a simple algorithm such as one applying a constant character offset. The parent/child relationship allows a hierarchial linkage. The order stage identifier is used in subsequent validation to determine the importance of validation failures. For example if a supplier is not found for a low cost, low risk item then the request may be allowed to proceed. However in validation of greater value items the absence of an approved supplier may cause rejection of the request.

At this stage, it is timely to describe a general administrative tool for effective dissemination of processing control throughout the system. An administrator inputs a text message relating to a general data entity such as "supplier". This text reflects the administrator's knowledge of the entity. The workstation is typically, but not necessarily, a file server or other host. Selected portions of the text are parsed in step 100 by iteratively identifying space characters in the selected text portions to isolate each word. Isolated words are compared against a predefined list of noise words in step 101 and words matched to entries on the list are ignored. A keyword file with isolated words not found in the list is generated in step 102. Each word is linked with a data value, such as a particular supplier being linked with a product. A lookup file is generated from the keyword file in step 103 by indexing and writing non duplicate entries of the keyword file. The lookup file is then stored for searching by users to allow effective distributed control. The lookup files may be addressed according to data entity in a dynamic manner to allow browsing and selection of data values.

Validation of the order request is continued in step 10 by retrieving the control register. The configuration matrix is retrieved in step 11 and the order stage identifier of the control register is isolated in step 12. The configuration matrix is addressed with the order stage identifier in step 13. The order stage identifier is then incremented in step 14.

This allows retrieval of the relevant control register and a set of validation routines. These routines were initially written according to the requirements specified by the prompt file.

There is a validation routine for every data entity and they are loaded dynamically according to the entities in a particular order request.

The routines are then run in step 15 and the output is stored as a set of True/False flags. For each False flag the corresponding entry in the control register is read. A STOP value causes the method to halt. A WARNING value causes an error message to be displayed. The error message is in practice queued for later display to allow both continuity and comprehensive output of all errors occurring in the system. This validation stage is illustrated in FIG. 3, in which the relationships between routines, routine outputs, control register entries, and actions are shown.

The configuration matrix is updated in step 16 by writing a next action value, in this case a next user. The matrix allows the request to be monitored by manually updating it or by automatic updating according to a pre-set action sequences, the current action being indicated by a counter. This significantly reduces the work required and allows a greater degree of flexibility while maintaining full control. Similarly a change to the matrix may cause an error handling routine to be executed where previously another operation was performed.

The method has now reached an important stage, namely initial validation of the request to prevent routing around the distributed system if invalid. The validation up to this stage provides a very effective screening filter for decentralised purchasing.

When the order request has been validated it is transmitted to an order request router in step 20 and the order request router receives the validated order request in step 21. The next action entry of the matrix associated with the order request is retrieved in step 22 and addressed in step 23. A transmit code is identified in step 24 by selection from a predefined list of action codes in step 25.

An order request destination address is identified in step 26 by reading the next action entry for destinations. Each line of the order request is then read in turn in step 27 and written to a message file in step 28. A source identifier from the local station is read in stage 29 and written to a router slip in step 30. The router slip is attached to the message file in step 31. The use of the router slip in this way provides a full audit trail for the order request, further enhancing the level of control achieved in a distributed system.

The router slip is generated from a fixed template, which is modified according to the configuration matrix and the order request. The template has a set of tasks, programmed as objects. Each task has a set of rules which are run using the actual matrix data to determine if the task applies to this order request. If so, the task object is instantiated. Once instantiated, each task object incorporates in the router slip rules which dynamically indicate its active/redundant status, if the current user can perform it, and if not, which user can. These rules therefore mirror those used for initial instantiation of the task objects.

The message file and attached router slip are then directed to a remote station. This is done by first identifying a transport protocol for a connection between the local and remote stations in step 35, using operating system settings. This transport protocol may be any one of a number of types such as SNA, TCP/IP or E-mail. The message file and attached router slip are then encoded in step 36 according to the identified transport protocol with a predefined encoding table. This allows the order request to be easily transmitted across any type and between a variety of hardware platforms. The message file and attached slip file are received in the remote station in step 37. The transport protocol used for the connection between the local and remote stations is again identified in step 38. Individual bytes associated with the message file and associated router slip in are aligned in response to the transport protocol in step 39. This allows different hardware platforms using different massaging systems such as VIM or MAPI to be interfaced without user intervention.

When received by the remote station the message file and the router slip are processed in the router of that station by retrieving appropriate action entries in the matrix in step 40. The entry is addressed in step 41 and an authorization code is identified in step 42 by comparing the addressed contents of the next action entry with the predefined list of action codes previously used in step 25. The authorization code may be the conventional user password, possibly supplemented by more robust coding including key encryption.

By communication and processing of the order request in this way the request moves through the system very effectively, allowing all necessary personnel to review and approve.

An authorised order request is generated in step 43 by adding an authorization code entered by an authorising user to the order request. The order stage identifier is then incremented in step 44 to indicate compliance with the validation criteria available from the matrix retrieved in step 11.

The control register for the authorised order request is regenerated in step 45 by selectively comparing portions of the authorised order request with the reference register retrieved in step 7. The authorised order request is then validated in step 46 by retrieving the regenerated control register and validation routines from step 45 and retrieving the configuration matrix, isolating the incremented order stage identifier produced in step 44 and addressing the configuration matrix with the isolated order stage identifier. Validation then takes place as described above with reference to FIG. 3 and the next action entry associated with the order request is updated in step 48 based on the results of the comparison.

An authorised message file is generated in step 50 and a station address is appended to the attached router slip in step 51. The authorised message file and attached router slip are then directed to a remote station in step 52. It will be noted that the remote station to which the files are directed in step 52 may be the station of the order supplier, a printer for printing an order docket or alternatively another station for further authorization if required. In this way, orders may be efficiently processed without using excessive resources. Control is also guaranteed by specifying which orders require which level of authorization using the level identifier. Any station address which is appended can receive notification/reminders through the life-cycle of the order. This can occur automatically as configured initially from the fixed template.

It will be appreciated that the method controls flow of order requests in a distributed system in an effective and efficient manner, irrespective of how complex the system is with little or no paper handling. The configuration matrix dynamically tracks progress, particularly in relation to current and next user approvals and other actions, and request/order stage. This provides at all times the necessary link to validate using the associated control register and set of validation routines. The control register allows masking of general entity-related routines for specific requests, thus allowing use of common routines to a large extent and avoiding complexity and associated processor delays.

The router slip allows communication control after initial validation in a simple and effective manner. Each slip is generated in a simple way using the template and object instantiation rules selected by the matrix. These rules are then applied at all locations in the system to which the order message is directed in order to dynamically maintain control in real time.

It will also be appreciated that the text processing administrative tool allows effective dissemination of knowledge throughout the system. In practice, it may for example allow knowledge held by a purchasing manager relating to products and suppliers to be available to users at geographically remote locations.

We claim:

1. An order processing method carried out in a distributed data processing system comprising a local station and a plurality of nodes, the method comprising the steps of:

the local station receiving an order request, identifying a relevant order type, retrieving a prompt file associated with said order type, prompting user input of order request data according to said prompt file, and receiving order request data;

generating a configuration matrix storing order request parameter values including the order type, required action data, and validation data to allow dynamic control of the order request;

validating the request according to validation routines operating with at least some of the received order request data, the validation routines being selected according to the validation data of the configuration matrix;

writing order request data of valid requests to a message file and appending a router slip comprising a source identifier and a set of tasks derived from the configuration matrix, said tasks indicating users from whom authorization is required; and transmitting the message file and the router slip to nodes of the distributed system until the slip records performance of all of said tasks.

2. An order processing method as claimed in claim 1, wherein at least one of the plurality of nodes which receives the message file and router slip;

retrieves from the router slip a required authorization code to allow user authorization at the node;

regenerates the order request from the message file;

writes user authorization data to the router slip using said authorization codes; and re-validates the order request according to the validation routines associated with at least some of the user authorization data.

3. An order processing method as claimed in claim 2, wherein said node performs the further step of appending a node address to the router slip, writing the order request data to a message file and transmitting said message file and said router slip to a remote node.

4. An order processing method as claimed in claim 1, wherein the local station generates the router slip by instantiation of task objects from a template according to the configuration matrix.

5. An order processing method as claimed in claim 1, wherein the local station generates the router slip by instantiation of task objects from a template by applying rules using configuration matrix data to determine if a task object of the template applies to the order request.

6. An order processing method as claimed in claim 5, wherein the rules are stored with the instantiated task objects, and the method comprises the further steps of dynamically determining applicability of the task objects at subsequent order stages by applying the rules with current matrix data.

7. An order processing method as claimed in claim 1, wherein the router slip stores tasks which cause transmission of notification signals to nodes of the system.

8. An order processing method as claimed in claim 1, wherein the local station validates the order request by:

generating a control register for the order request by selectively comparing entities of the order request data with a reference register, the control register indicating relative importance of the entities by storing an entry indicating for each data entity that validation is not applicable, could result in a warning, or could stop the request;

retrieving a set of validation routines and running each routine with respect to an order request data entity, and identifying as invalid an entity if both the routine output is false and the associated control register entry indicates a warning or a request stop;

outputting an error message if the control register indicates a warning for an invalid entity; and halting the request if the control register indicates a stop for an invalid entity.

9. An order processing method as claimed in claim 1, comprising the further step of the local station accessing a lookup table of relevant data to input to the order when creating the order request.

10. An order processing method as claimed in claim 9 wherein the lookup table is generated by:

an administration processor of the system parsing selected text portions of an inputted administration message by iteratively identifying space characters in the selected text portions to isolate each word;

comparing each isolated word against a predefined list of noise words;

ignoring isolated words found in the list;

generating a keyword file with isolated words and associated words;

generating a lookup file from the keyword file by indexing and writing non duplicate entries of the keyword file.

11. An order processing method as claimed in claim 1, wherein the step of transmitting the message file and the attached router slip to nodes of the distributed system includes the step of:

identifying a transport protocol for a connection between the local station and a first node; and encoding the message file and attached router slip in response to the identified transport protocol with a predefined encoding table.

12. An order processing method as claimed in claim 11, wherein the step of encoding the message file and attached router slip includes the step of:

identifying the transport protocol; and aligning bytes associated with the message file and associate router slip in response to the identified transport protocol.

* * * * *

UNITED STATES PATENT AND TRADEMARK OFFICE
CERTIFICATE OF CORRECTION

PATENT NO. : 5,937,393

DATED : August 10, 1999

INVENTOR(S) : Aidan O'LEARY et al

It is certified that error appears in the above-identified patent and that said Letters Patent is hereby corrected as shown below:

In the Drawings:
Sheet 3 of 5 of the drawings containing one figure with no Fig. number should be deleted and replaced with Sheet 3 of 5 containing Fig. 2(a) as attached Signed and Sealed this Fifteenth Day of February, 2000

*Attest:*

Q. TODD DICKINSON

*Attesting Officer*   Commissioner of Patents and Trademarks